United States Patent
Salter et al.

(10) Patent No.: US 12,250,197 B2
(45) Date of Patent: Mar. 11, 2025

(54) AUTOMATED EXTERNAL IP ADDRESS DISCOVERY OF SERVICES IN A PUBLIC CLOUD ENVIRONMENT

(71) Applicant: Salesforce.com, Inc., San Francisco, CA (US)

(72) Inventors: Adam J. Salter, Pacifica, CA (US); Deepanshu Badola, San Francisco, CA (US); Stephen Fung, Daly Ciy, CA (US); Santhosh ram Vetrinadar Manohar, San Jose, CA (US); Varun Kulkarni Somashekhar, Fremont, CA (US); Amitabh B. Chakrabarty, Fremont, CA (US); Vinod Vasant Pai, Sunnyvale, CA (US); Christopher Jason Donley, Bothell, WA (US); Prabhat Singh, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 7 days.

(21) Appl. No.: 17/397,772

(22) Filed: Aug. 9, 2021

(65) Prior Publication Data
US 2023/0039162 A1    Feb. 9, 2023

(51) Int. Cl.
*H04L 61/4541* (2022.01)
*H04L 61/2585* (2022.01)
*H04L 61/5076* (2022.01)
*H04L 67/51* (2022.01)

(52) U.S. Cl.
CPC ...... *H04L 61/4541* (2022.05); *H04L 61/2585* (2013.01); *H04L 61/5076* (2022.05); *H04L 67/51* (2022.05)

(58) Field of Classification Search
CPC . H04L 61/4541; H04L 67/51; H04L 61/5076; H04L 61/2585
See application file for complete search history.

(56) References Cited

U.S. PATENT DOCUMENTS

| | | | | |
|---|---|---|---|---|
| 7,725,501 B1 * | 5/2010 | Stillman | ............... | G06F 16/289 707/805 |
| 11,153,173 B1 * | 10/2021 | Rebeja | ................ | H04L 41/0806 |
| 2013/0246589 A1 * | 9/2013 | Klemba | ............. | H04L 41/5096 709/221 |

(Continued)

*Primary Examiner* — Joseph L Greene
(74) *Attorney, Agent, or Firm* — Sterne, Kessler, Goldstein & Fox P.L.L.C.

(57) ABSTRACT

A system is disclosed for acquiring and managing data regarding external IP (EIP) addresses of services offered in a trusted public cloud environment. The system monitors an application program interface of a service executing in a trusted public cloud environment for occurrence of an event that is related to an EIP of the service. When an event is detected, the system extract EIP related data and metadata of the service, generates a message with the extracted EIP data, and posts the message to a central message queue. The system monitors the message queue for the presence of a new message. Upon detecting a new message, the system processes the message, extracts EIP related data. metadata, and identifies an action. A central database that stores EIP related information of services executing in the trusted public cloud environment is updated based on the identified action.

8 Claims, 6 Drawing Sheets

(56) References Cited

U.S. PATENT DOCUMENTS

| | | | | |
|---|---|---|---|---|
| 2015/0324181 A1* | 11/2015 | Segal | ............... | H04W 52/0264 |
| | | | | 709/217 |
| 2018/0083835 A1* | 3/2018 | Cole | ................... | G06F 3/0482 |
| 2019/0103993 A1* | 4/2019 | Cidon | ................. | H04L 41/0895 |
| 2019/0349405 A1* | 11/2019 | Bengtson | ............ | H04L 63/0823 |
| 2020/0057664 A1* | 2/2020 | Durham | .................. | G06F 21/53 |
| 2020/0092254 A1* | 3/2020 | Goeringer | ............... | H04L 45/46 |
| 2020/0228407 A1* | 7/2020 | Urmese | .............. | H04L 41/0806 |
| 2021/0035069 A1* | 2/2021 | Parikh | .................... | G06Q 30/04 |

* cited by examiner

AUTOMATED EXTERNAL IP ADDRESS DISCOVERY OF SERVICES IN A PUBLIC CLOUD ENVIRONMENT

BACKGROUND

Field of Art

This disclosure relates in general to communication within a public cloud environment, and in particular to automated detection and maintenance of external public IP addresses associated with services in the public cloud environment.

Description of the Related Art

Cloud computing platforms has become increasingly popular in providing software, platform, and infrastructure services. For instance, public cloud service providers may provide on-demand network access to compute resources, database storage, content delivery, and other services that may be used by entities. As more and more services migrate to a public cloud environment, security and reliability issues begin to arise.

Services executing with a public cloud environment may be provisioned for access through external IP addresses (EIPs). These EIPs needed to be stored and made available to consuming services. Conventionally, storing and publishing an external IP address (EIP) is performed by owner of the service. However, this may pose problems, since there may be incomplete information stored regarding an EIP, outdated information associated with an EIP, the service owners may inadvertently expose internal resources to entities on the Internet, thereby presenting security risks, etc.

Accordingly, conventional techniques for maintaining information about EIPs associated with services executing with a public cloud environment may have limited reliability and security.

Figure 1:
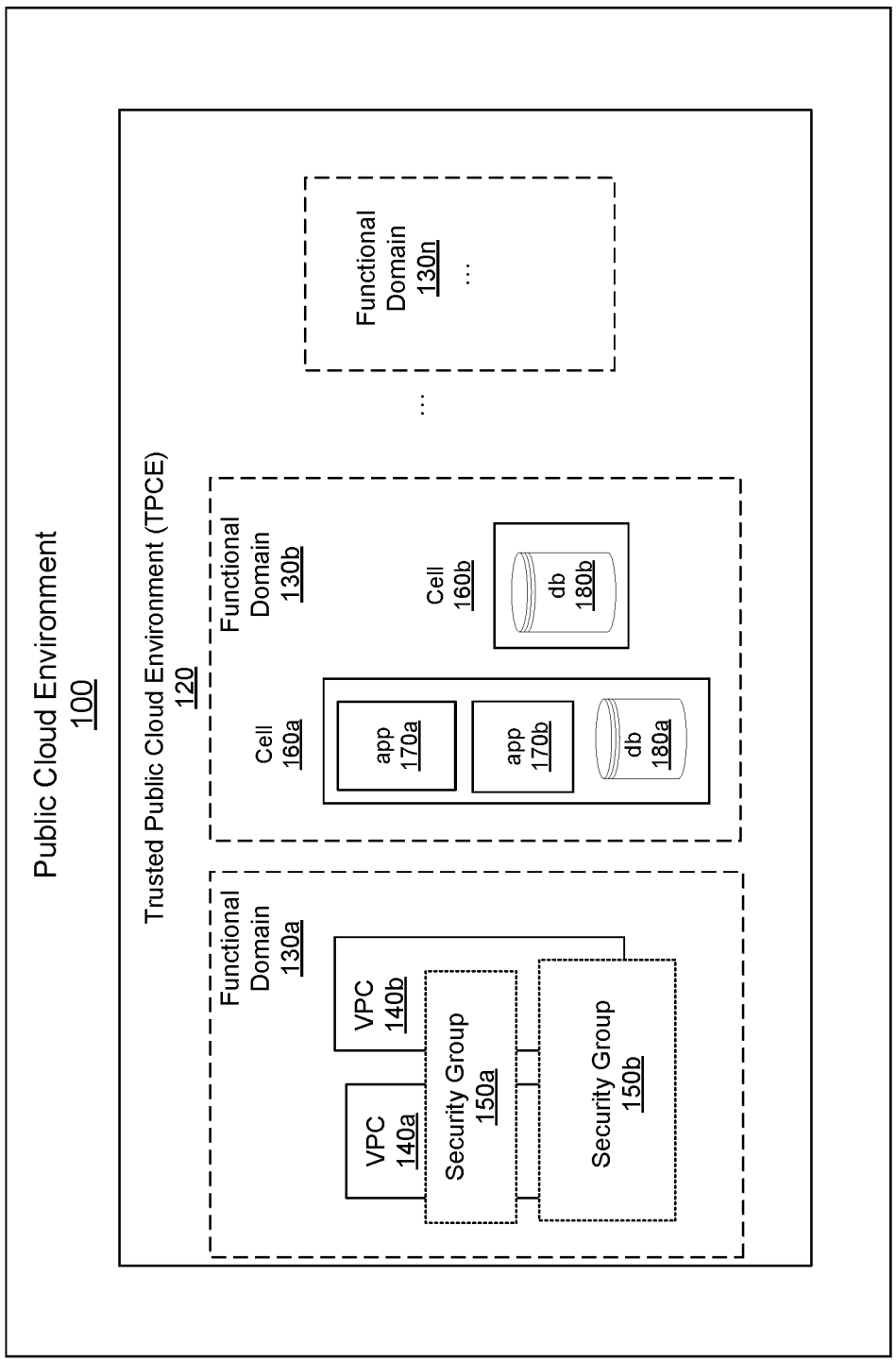
FIG. 1 depicts a block diagram illustrating functional blocks for a trusted public cloud environment that leverages a widely available public cloud environment, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral.

DETAILED DESCRIPTION

More and more entities, such as enterprises, are migrating to public cloud environments. Customers of a public cloud environment may be producers offering a variety of services, as well as consumers of these services. In a dynamic public cloud environment (PCE), many new services/resources may be provisioned with public IP addresses. These addresses needed to be stored and made available to consuming services. Conventionally, storing and publishing an EIP is performed by the associated service owner (SO). However, this may pose problems, since there may be incomplete information stored regarding an EIP, outdated information associated with an EIP, the SOs may inadvertently expose internal resources to entities on the Internet, thereby presenting security risks, etc.

Furthermore, conventionally IP addresses in use across the Internet may be collected by network crawlers deployed across the Internet. Such network crawling poses limitations, including acquire a major portion (e.g., 80%) of the EIP information easily but need to employ significant effort to obtain the remaining (e.g., 20%) EIP information due to connection issues, configuration issues, etc.

Embodiments of the system described herein resolve these issues. A system according to various embodiments performs an automated detection of EIPs as soon as services/resources get provisioned with these addresses. Thus, manual reporting that is dependent on service owners reporting EIP related changes promptly is replaced by automated detection of EIP-related events which then triggers further EIP-related data extraction and storage activities in an automated manner. The automated detection and storage of EIPs described herein may be used for enforcing security and access control policies with respect to the provisioned services and resources soon after the EIP provisioning occurs.

The system performs this by monitoring API calls within individual service accounts in the public cloud environment (for e.g., individual service accounts within a trusted public cloud environment—such as individual AWS™ accounts, individual Azure™ subscriptions, individual GCP™ projects, etc.). The monitoring is performed for events that may be associated with EIPs. Upon detecting a triggering event, the system packages details associated with the EIP into a new message. This message is encrypted and entered into a central FIFO queue. Each new entry in the central queue is a triggering event for merging service/EIP details in the message into an existing central object storage (e.g., an AWS™ S3 bucket). The system leverages native cloud services (such as AWS™ lambda and Azure™ functions) to perform the monitoring and packaging, as well as performing storage and maintenance tasks, thereby providing substrate agnostic functionality across various cloud platforms. The system comprises a central function that maintains a central database/list of EIPs, a client detection function that sends update when a change is detected in any EIP, and a client scan function that periodically scans client accounts to report EIP usage.

Furthermore, in embodiments described herein, the system is not dependent on identifying groups of contiguously allocated EIPs or known ranges of allocated addresses or merely known EIPs. The system detects and maintains information about any EIP in use when a service application is provisioned with the EIP—and hence gathers information about hitherto unknown EIPs and known EIPs with equal facility. Since the system is also configured to additionally periodically scan service accounts to ensure that all provisioned EIPs have updated entries in the central database/list of EIPs, the system provides automated recoverability, particularly when there are any missed API calls during the monitoring.

Overall System Environment

FIG. 1 shows a block diagram illustrating a trusted public cloud environment (TPCE) 120 that leverages an available public cloud environment (PCE) 100, in accordance with one embodiment. Public cloud environments 100 are owned and operated by third-party providers, and the hardware, software, and supporting infrastructure is also owned and managed by the third-party cloud provider. Examples of public cloud environment 100 include, for example, Amazon Web Services™ (AWS™), Google Cloud Platform™ (GCP™), Azure™, etc.

A public cloud environment 100 offers a range of public cloud computing infrastructure services 110 that may be used on demand by a trusted public cloud environment 120. Examples of the public cloud computing infrastructure services include servers, storage, databases, networking, security, load balancing, software, analytics, intelligence, and other infrastructure service functionalities. These infrastructure services may be used by the trusted public cloud environment 120 to build, deploy, and manage applications in a scalable and secure manner. The trusted public cloud environment 120 is a trusted public cloud architecture with processing resources, networking resources, storage resources, and other service functionalities with security boundaries that are strictly enforced. An example of a trusted public cloud environment 120 is a datacenter with defined and strictly enforced security boundaries.

The trusted public cloud environment 120 has specific attributes, in accordance with some embodiments. These attributes include attributes required to use available public cloud infrastructure services 110, for example region-specific attributes or environment type specific attributes. Further attributes support security needs, availability expectations, architectural agility coupled with reliability, developer agility, distributed capabilities, and the ability to perform on multiple available public cloud environments.

The trusted public cloud environment 120 may support multiple functional domains 130a, 130b, . . . , 130n. Each functional domain (FD) 130 represents a set of capabilities and features and services offered by one or more computing systems that can be built and delivered independently, in accordance with one embodiment. A functional domain 130 may also be viewed a set of cohesive technical use-case functionalities offered by one or more computing systems. A functional domain 130 has strictly enforced security boundaries. A functional domain 130 defines a scope for modifications. Thus, any modifications to an entity—such as a capability, feature, or service—offered by one or more computing systems within a functional domain 130 may propagate as needed or suitable to entities within the functional domain, but will not propagate to an entity residing outside the bounded definition of the functional domain 130. Although the term functional domain is used herein, the term may be replaced with service group representing a group of services that are specified and configured together in a datacenter configured in a cloud platform.

Each functional domain 130 may contain multiple virtual private cloud (VPC) networks, 140a, 140b, . . . , etc. Each virtual private cloud 140 is an on-demand pool of shared resources that are allocated within the functional domain 130 and provide a level of isolation between the users using the resources. Each functional domain 130 may also contain multiple security groups, 150a, 150b, . . . , etc. Each security group 150 represents a declarative model for enforcing network segmentation. Each security group 150 includes entities with similar risk service profiles collected into a single security group with explicit declarative policy brokering connectivity between the groups.

A functional domain 130 may also contain one or more cells, 160, 160b, . . . , etc. A cell 160 represents a collection of services that scale together, and that may be sharded. These services may be applications 170a, 170b, . . . , etc., and/or databases 180a, 180b, . . . , etc.

Figure 2:
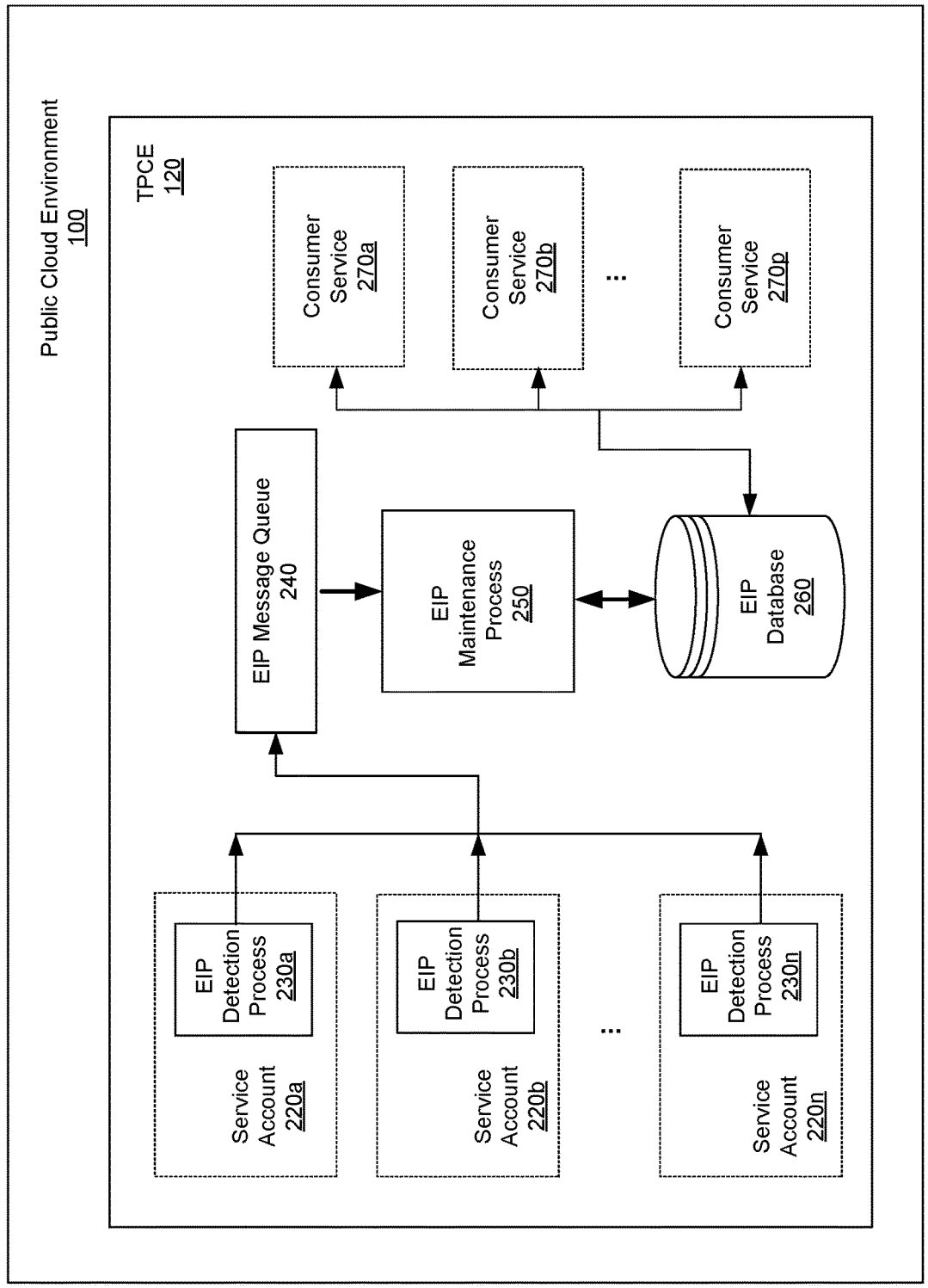
FIG. 2 shows a system configuration illustrating automated EIP address detection and central EIP maintenance and storage in a trusted public cloud environment, according to one embodiment.

In embodiments described herein, within each functional domain 130, the individual service applications 170a, 170b, . . . , etc., may be each individually monitored by an instance of an EIP detection process (such as described with respect to FIG. 2). The EIP detection process may execute an event-driven process within each service account (not shown) that resides in functional domain 130, where each service account may be associated with one or more executing service applications 170. In some embodiments, the EIP detection process monitors API calls within each individual service account (such as a service account associated with service application 170a) for EIP-related event occurrences.

In embodiments described herein, the trusted public cloud environment 120 may also have a central object storage for maintenance of EIP-related data that is gathered by various instances of the EIP detection processes executing with the environment. An EIP maintenance process (such as described in FIG. 2) executing within the TPCE 120 may perform actions that ensure that updated information in association with various EIPs of services executing in the TPCE 120 are stored in the central data storage and available for access by consuming services in the TPCE 120.

EIP Detection and Maintenance System—an Example Use Case

FIG. 2 depicts a use-case example of an EIP detection and maintenance system, in accordance with one embodiment. The example shown in FIG. 2 may be performed in a trusted public cloud environment such as trusted public cloud environment 120 that resides within a public cloud environment such as public cloud environment 100 depicted in FIG. 1. FIG. 2 depicts operational functionalities of instances of EIP detection processes 230 and a central EIP maintenance process 250.

A service account 220 may have a service application that is offering a service for use by a consumer. Each service account 220 (220a, 220b . . . 220n) may reside in one or more functional domains (such as functional domain 130 in FIG. 1) of the trusted public cloud environment 120. Each service application 220 may be provisioned with an external IP address. Each service account 220 may interface with other interacting entities (such as consumer services, etc.) using application programming interfaces (APIs). When a service application 220 is provisioned with an EIP, the provisioning causes an event to be triggered in association with the API of the service application 220.

In some embodiments, each API of a service application 220 is monitored by an EIP detection process 230. Thus, the EIP detection processes 230 are deployed at each of the service accounts, and there may be individual instances of EIP detection processes 230 (i.e., 230a, 230b, . . . , 230n) monitoring corresponding individual APIs of service applications 220 (i.e., 220a, 220b, . . . , 220n). In some embodiments, the instances of the EIP detection processes 230 execute in individual service accounts of executing service applications by leveraging native public cloud functionalities. For example, an AWS™ lambda function may be configured to execute within a particular service account of a deployed service application as an instance of the EIP detection process 230. When an EIP detection process 230 detects the occurrence of an EIP-related event in a monitored API, the EIP performs one or more lookup actions in association with the triggering EIP-related event, and extracts information in association with the EIP. The extracted information may be, for example, an EIP address value as well as metadata associated with the EIP, such as a service name, an environment in which the service resides, timestamp, etc. The EIP detection process generates a data structure with the EIP address value and the metadata associated with the EIP. Subsequently the EIP detection process will provide a message with the generated data structure to a message queue service for posting within an EIP message queue 240. The EIP message queue 240 is associated with information regarding external IP addresses of services offered within the trusted public cloud environment. This information regarding external IP addresses of services offered within the trusted public cloud environment may be subsequently used for enforcing security and access control policies with respect to the service in the trusted public cloud environment In some embodiments, the EIP maintenance process 250 is deployed within a main central location in the trusted public cloud environment 120. The EIP maintenance process executes in conjunction with the EIP message queue 240 and a central EIP data store 260 that stores information in association with EIPs. The EIP maintenance process 250 monitors the EIP message queue 240 for new messages within the queue 240. When a new message is detected in the EIP message queue 240, the EIP maintenance process 250 processes the detected new message to extract a data structure associated with an EIP of a service offered within the trusted public cloud environment. The EIP maintenance process 250 processes the extracted data structure and identifies an action to be performed to an entry in an EIP database 260. The EIP maintenance process 250 subsequently updates the entry in the EIP database 260 based on the identified action.

In some embodiments, the EIP database 260 stores data in association with EIPs. Entries in the EIP database may be associated with allocation identifiers, association identifiers, functional domains, and services executing in the trusted public cloud environment. The entries associated with a service may have entries for the address value of EIP, a name for the service, a functional domain in which the service executes, timestamps, an allocation identifier and an association identifier associated with the service. The entry in the EIP database 260 that is in association with the EIP is updated based on the action that is identified by the EIP maintenance process 250. In some embodiments, the EIP database 260 is a central database that may be securely located within a trusted public cloud environment 120 that is within any one of the public cloud environments 100 (e.g., Amazon Web Services™ (AWS™), Google Cloud Platform™ (GCP™), Azure™, etc.). The EIP database 260 provides updated information in association with the stored EIPs to any consumer services 270 (e.g., 270a, 270b, . . . , 270n) in the trusted public cloud environment 120 that may require access to services deployed within the environment 120. This provided information may be used for enforcing security and access control policies with respect to the service in the trusted public cloud environment. In some embodiments, service owners of service applications may be able to view the contents of the EIP database 260, including querying the EIP database 260 about EIPs assigned to a service, and EIPs that have been provisioned and listed against their services. In some embodiments, consumer services that are located outside of the trusted public cloud environment 120 (e.g., consumer services that are located within a trusted public cloud environment for a different public cloud environment than public cloud environment 100) may be able to retrieve updated information in association with the stored EIPs in the EIP database 260.

System Architecture

Figure 3:
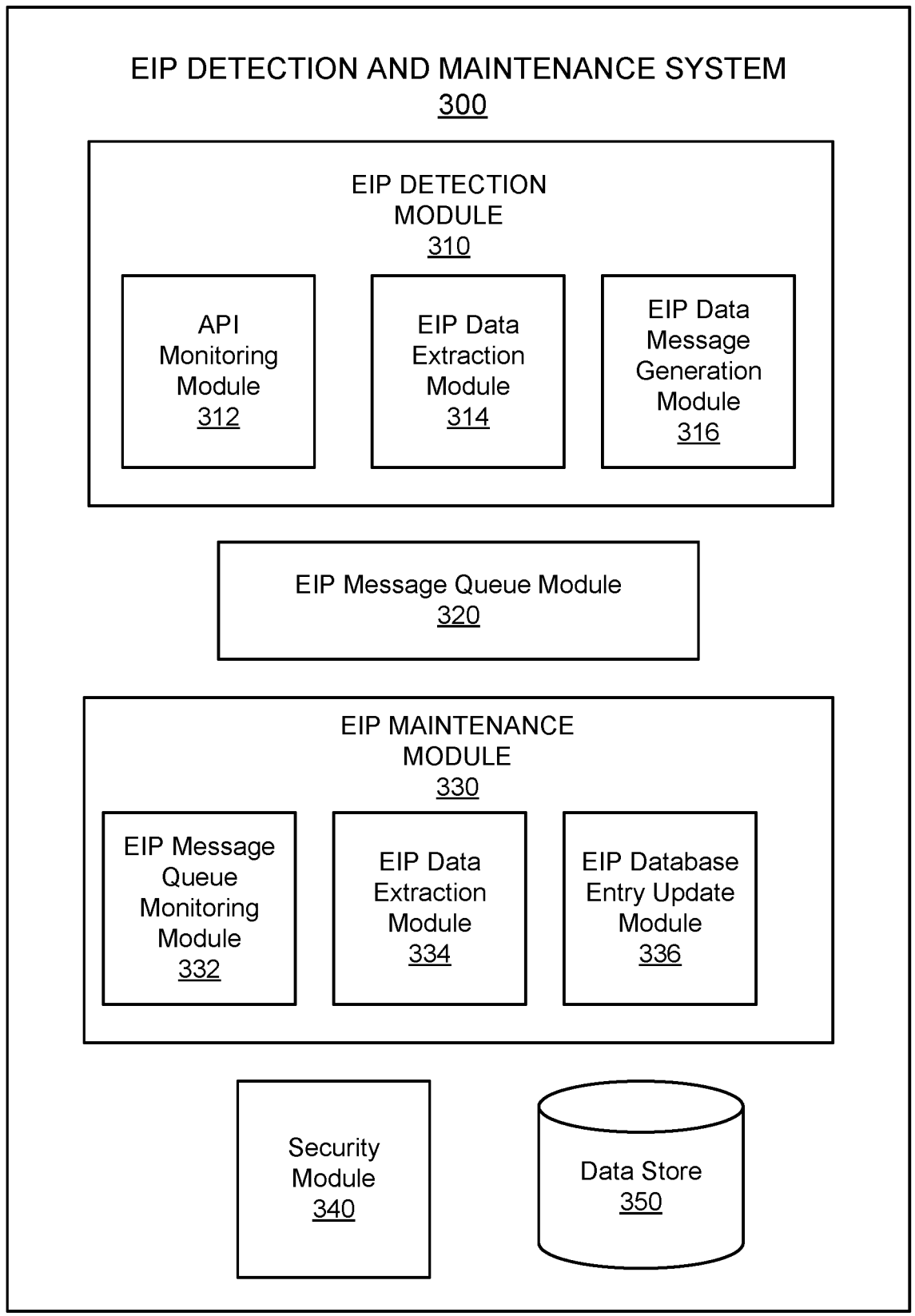
FIG. 3 is a block diagram illustrating components of an EIP detection and maintenance system in a trusted public cloud environment, according to one embodiment.

FIG. 3 is a block diagram illustrating modules of the EIP detection and maintenance system 300 according to one embodiment. The EIP detection and maintenance system 300 may be used to perform the operational functionalities described in FIG. 2 as being performed by EIP detection process 230 and EIP maintenance process 250. The EIP detection and maintenance system 300 includes an EIP detection module 310, and EIP message queue module 320, an EIP maintenance module 330, a security module 340, and a data store 350. Alternative configurations of the EIP detection and maintenance system 300 may include different and/or additional modules. Functionality that is indicated as being performed by a particular module may be performed by other modules than those indicated herein. Furthermore, steps of any processes described herein can be performed in an order different from that illustrated herein.

The modules of EIP detection and maintenance system 300 may execute in a trusted public cloud environment such as a trusted public cloud environment 120 that resides within a public cloud environment such as public cloud environment 100 depicted in FIG. 1. The EIP detection module 310 may deploy individual instances of the EIP detection processes 230 to execute within functional domains in conjunction with the security module 330, while the EIP maintenance module 320 may execute in a central location in conjunction with the security module 330 and the data store 340.

In some embodiments, the EIP detection module 310 deploys instances of the EIP detection processes 230 to execute in individual service accounts of executing service applications, such as service accounts 220 in FIG. 2, by leveraging native public cloud functionalities. For example, an AWS™ lambda function may be configured to execute within a particular service account of a deployed as an instance of the EIP detection module 310. The term "EIP detection module" is used synonymously with the terms "instance of an EIP detection module," "EIP detection process" and "instance of an EIP detection process" herein.

In some embodiments, the EIP detection module 310 may include an API monitoring module 312, an EIP data extraction module 314 and an EIP data message generation module 316. Alternative configurations of the EIP detection module 310 may include different and/or additional modules, with functionalities indicated as being performed by a particular module being performed by other modules than those indicated herein. Furthermore, steps of any processes described herein can be performed in an order different from that illustrated herein.

The API monitoring module 312 monitors API calls associated with the service application, and triggers on detecting the occurrence of specific EIP-related events in the monitored API calls. In some embodiments, the triggering events may be API calls that are directed to any of the following events: associate an EIP, disassociate an EIP, create a network address translation (NAT) gateway, delete a NAT gateway, release an EIP, create a virtual private network (VPN) connection, and delete a VPN connection. Other embodiments of the EIP detection module 310 may be configured to trigger on other EIP-related events. In some embodiments, the API monitoring module may also periodically scan all service accounts for any EIP related information that have not been previously reported or that are missed by the API call monitoring.

The EIP data extraction module 314 extracts information regarding a specific EIP and metadata associated with the EIP. When the API monitoring module 312 indicates the occurrence of one of the specific EIP-related events in a monitored API call, the triggering event invokes the EIP data extraction module 314. In some embodiments, the module 314 that is executing in a service account may issue one or more API calls against the public cloud environment, such as public cloud environment 100 depicted in FIG. 1, to obtain EIP related information associated with the triggering event. The EIP related information may include: the EIP address, service application details (such as service name, functional domain in which the service application executes, timestamp, etc.), and the triggering event action details such as: "associate", "disassociate", "create NAT gateway", "delete NAT gateway", and "release". In some embodiments, the service application details may be looked up from mandatory tags associated with the public cloud environment 100.

The EIP data message generation module 316 receives the extracted EIP-related information associated with the triggering event. The module 316 packages the extracted EIP-related information into a data format that is appropriate for providing to a message queuing service for posting in a message queue within the trusted public cloud environment. For each of the identified actions in the triggering event, the EIP data message generation module 316 performs a set of actions. Note that in the actions, the allocation identifier refers to the public cloud environment identifier, while the association identifiers refer to associations between the EIP and the resource that the EIP is associated with. The actions are briefly described below:

When the identified action is "associate" the module 316 extracts the allocation identifier and the association identifier from the message and generates a data structure as described below.

When the identified action is "disassociate" the module 316 extracts the association identifier from the message, and generates a data structure as described below.

When the identified action is "create NAT gateway" the module 316 extracts the allocation identifier and the NAT gateway identifier from the message, and generates a data structure as described below.

When the identified action is "delete NAT gateway" the module 316 extracts the NAT gateway identifier from the message and generates a data structure as described below.

When the identified action is "release" the module 316 extracts the allocation identifier from the message and generates a data structure as described below.

In some embodiments, the EIP data message generation module 316 packages the EIP-specific details into a JSON data structure to adhere to a pre-specified JSON schema for posting to as an EIP message to an EIP message queue. An example of an EIP message as a JSON block including EIP metadata as an ip_metadata sub-block is shown below:

```
{
"name": "name-dev1-uswest2-abcdef-testingdemo",
"TPCE_provider": {
   "region": "us-west-2",
   "substrate": "aws"
},
"environment": "dev1",
"public_ips ": {
   "services": [ {
      "service_name": "testingdemo",
      "cidr": [
        "1.2.3.4/32",
      ],
      "ip_metadata": [
         {  "ip_address": "1.2.3.4/32",
            "allocation_id": "EIP Allocation ID",
            #<IDs will be linked substrate flag above>
            "association_id": "EIP Association ID",
            #<association id will show that IP is in service>
            "timestamp": ""
         },
      ],
      "resource_type": "natgw",
      "tags": [
         {  "key": "key1",
            "value": "value1"
         }, {
            "key": "key2",
            "value": "value2"
         }
      ]
   }],
   "functional_domain_name": "abcdef",
   "functional_domain_type": "abcdef"
},
"TPCE_instance": "dev1-uswest2",
"grid": "",
"EIPDetection_And_Maintenance_action" : "add" | "delete"
}
```

The EIP data message generation module 316 connects to the EIP message queue module 320 and provides the EIP message for posting to the EIP message queue. The posted EIP message includes the packaged EIP details in the created JSON data structure such as the example shown above.

In some embodiments, prior to connecting to EIP message queue module 320, the EIP data message generation module 316 may need to acquire pre-specified security-related permissions within the trusted public cloud environment. In some embodiments, the EIP data message generation module 316 may need to explicitly request permission from the security module 330 for acquiring security-related permissions prior to connecting to the EIP message queue module 320. In some embodiments, the security-related permissions acquired by the module 316 may automatically provide permissions for encrypting the EIP message prior to posting. In some embodiments, the EIP data message generation module 316 may need to acquire explicit permission for encrypting the EIP message. Once the EIP data message generation module 316 acquires the required permissions the security module 330, the module 316 may retrieve encryption related parameters from the data store 340, encrypt the generated EIP message, and then connect to the EIP message queue module 320 for posting the EIP message.

The EIP message queue module 320 manages the EIP message queue (such as the EIP Message Queue 240 depicted in FIG. 2). The module 320 may be located inside a service account that includes the EIP maintenance module 330. In some embodiments, the EIP message queue module 320 may configure the EIP message queue as a FIFO queue. In some embodiments, the contents of the EIP message queue may be encrypted, and access to the contents of the queue may be permitted only to entities with prespecified security clearance levels. The EIP message queue module 320 may receive a request from the EIP data message generation module 316 regarding posting a new EIP message. The module 320 will store the message in the EIP message queue. In some embodiments, the module 320 will send an acknowledgement to the EIP data message generation module 316 to indicate successful posting of the new EIP message in the EIP message queue.

The EIP maintenance module 330 is deployed within a main central location in the trusted public cloud environment 120. The EIP maintenance module 330 operates in conjunction with the EIP message queue module 320 and a central EIP database 260 (shown in FIG. 2). In some embodiments, the EIP maintenance module 330 is configured by leveraging native public cloud functionalities. For example, an AWS™ lambda function may be configured to execute the functionalities of the deployed EIP maintenance module 330. In some embodiments, the EIP maintenance module 330 may include an EIP message queue monitoring module 332, an EIP data extraction module 334, and an EIP database entry update module 336. Alternative configurations of the EIP maintenance module 330 may include different and/or additional modules, with functionalities indicated as being performed by a particular module being performed by other modules than those indicated herein. Furthermore, steps of any processes described herein can be performed in an order different from that illustrated herein.

The EIP message queue monitoring module 332 monitors the EIP message queue for new messages. The EIP message queue monitoring module 332 is configured to trigger on detecting a new EIP message in the EIP message queue. In some embodiments, upon detecting the new EIP message, the EIP message queue monitoring module 332 may send an indication of the detected new message to the EIP data extraction module 334.

The EIP data extraction module 334 processes a new message in the EIP message queue to extract a data structure that is associated with an EIP of a service offered in the trusted public cloud environment. The extracted data includes the EIP-related information including: the EIP address, service application details (such as service name, functional domain in which the service application executes, timestamp, etc.), and EIP-related action details such as: "add" (an add operation), "delete" (a delete operation), "associate" (an associate operation), and "disassociate" (a disassociate operation). In some embodiments, the extracted data structure may be a JSON data structure that adheres to a pre-specified JSON schema, such as the JSON block including EIP metadata as an ip_metadata sub-block shown with respect to the EIP data message generation module 316.

The EIP database entry update module 336 processes the extracted data structure to identify the EIP, EIP metadata, and an associated action. The identified action is performed with respect to an entry related to the EIP in a centrally located EIP database (such as the EIP database 260 in FIG. 2). The actions that are identified by the EIP database entry module 336 based on processing the data structure include one of following: "add", "delete", "associate", and "disassociate". For each of these identified actions, the EIP database entry module 336 performs a set of actions with respect to the corresponding EIP entry in the EIP database. Briefly, the actions may be summarized as follows:

If the functional domain (or any group of services defined for a data center configured on a cloud platform) containing the service does not exist in as part of the current trusted public cloud environment entries in the EIP database, it is added If this service does not exist as part of the current trusted public cloud environment entries in the EIP database, it is added If the service exists but there are any new addresses, these new addresses are added If the service exists but the related EIP addresses have changed (some/all from the current EIP database entry are not in the new details) the old addresses are replaced with the new addresses.

These sets of actions are described in more detail below:

In some embodiments, the EIP database entry update module 336 identifies an "add" action. The extracted information includes the EIP metadata, the functional domain, and the service name. The "add" action is performed to add the service and associated functional domain to the EIP database entry, if it does not already exist. The actions include the following: When the functional domain information does not exist in the EIP database, a new entry for the functional domain is added to the EIP database. An entry for the service and service-related metadata (e.g., EIP address, service name, EIP metadata, etc.) are added in association with the functional domain. When the functional domain has an entry in the EIP database, it is determined if the service name exists in the EIP database under the functional domain. If the name exists, the EIP metadata in the extracted data structure is added to the service's EIP metadata in the entry. If the name does not exist, a new entry is created for the service under the functional domain, and the metadata (e.g., service name, tags, EIP metadata, etc.) are added in the new entry.

In some embodiments, the EIP database entry update module 336 identifies an "delete" action. The extracted information includes the allocation identifier. The "delete" actions performed by the module 336 include the following: When it is determined that the allocation identifier exists for any EIP metadata in the EIP database across all functional domains and services, the EIP metadata entry for the given allocation identifier is deleted. Subsequently, if the service has no EIPs listed in its cidr (classless inter-domain routing) list and no EIP metadata entries, the service entry is removed from the functional domain. Subsequently, if the functional domain does not have any services in it, the entry for the functional domain is deleted from the EIP database. Finally, a clean up function is executed to purge EIPs from the service's cidr list that do not have a corresponding EIP metadata entry. This clean up action is also executed when it is determined that the allocation identifier in the extracted data structure does not exist for any EIP metadata in the EIP database across all functional domains and services.

In some embodiments, the EIP database entry update module 336 identifies an "associate" action. The extracted information includes an allocation identifier and an association identifier. The "associate" actions performed by the module 336 include the following: the "add" actions described above are executed that adds the functional domain, service to the EIP database if the entry does not already exist. Subsequently the EIP address for the association event is added to the service's cidr list.

In some embodiments, the EIP database entry update module 336 identifies an "disassociate" action. The extracted information includes an association identifier. The "disassociate" actions performed by the module 336 include the following: Based on the association identifier, the EIP metadata entry in the EIP database is searched across all functional domains and services, and the EIP address (referenced in the EIP metadata from the service's cidr) is deleted.

In some embodiments, when the EIP database entry update module 336 identifies actions such as "create NAT gateway" and "delete NAT gateway" action, these actions are recorded as metadata against the IP address in the EIP database. This ensures that correct removal of the IP addresses from the database when the "disassociate", "delete", or "release" events are detected.

In some embodiments, instead of a dedicated EIP database, a centrally located object storage (e.g., an S3 bucket in AWS™) may store an EIP list file. In such embodiments, upon identifying the EIP and the associated action, the EIP database entry update module 336 downloads the EIP list file, and perform the actions mentioned with respect to the EIP database entry instead on the entry corresponding to the EIP in the EIP list. After the actions are completed, the modified EIP list file is saved back in the centrally located object storage.

The security module 340 ensures that only the trusted/authenticated EIP data message generation modules 316 connect to the EIP message queue module 320 for posting a message. The security module may perform explicit authentication of module 316. In some embodiments, the authentication of the module may automatically provide a limited set of permission, such as permission for encrypting the EIP message prior to connecting with the module 320 for posting to the EIP message queue. The security module 340 may also ensure that only a trusted/authenticated EIP database entry update module 336 performs updates to the EIP database or the EIP list files. The security module 340 may also connect back to a service account, such as service account 220 in FIG. 2 to verify any received EIP information.

The data store 350 stores information for the EIP detection and maintenance system 300. The stored data may in association with configuring the various modules of the EIP detection and maintenance system 300 for operational functionalities such as described above. The stored data may also include encryption and decryption parameters as well as data keys associated with posting and accessing EIP messages in the EIP message queue. The data store 340 is a memory, such as a read only memory (ROM), dynamic random-access memory (DRAM), static random-access memory (SRAM), or some combination thereof. In some embodiments, the various modules of the EIP detection and maintenance system 300 may pass various data values directly to each other. In some embodiments, the various modules of the EIP detection and maintenance system 300 may store data values in the data store 340 and retrieve data values as needed from the data store 340.

EIP Detection Process

Figure 4:
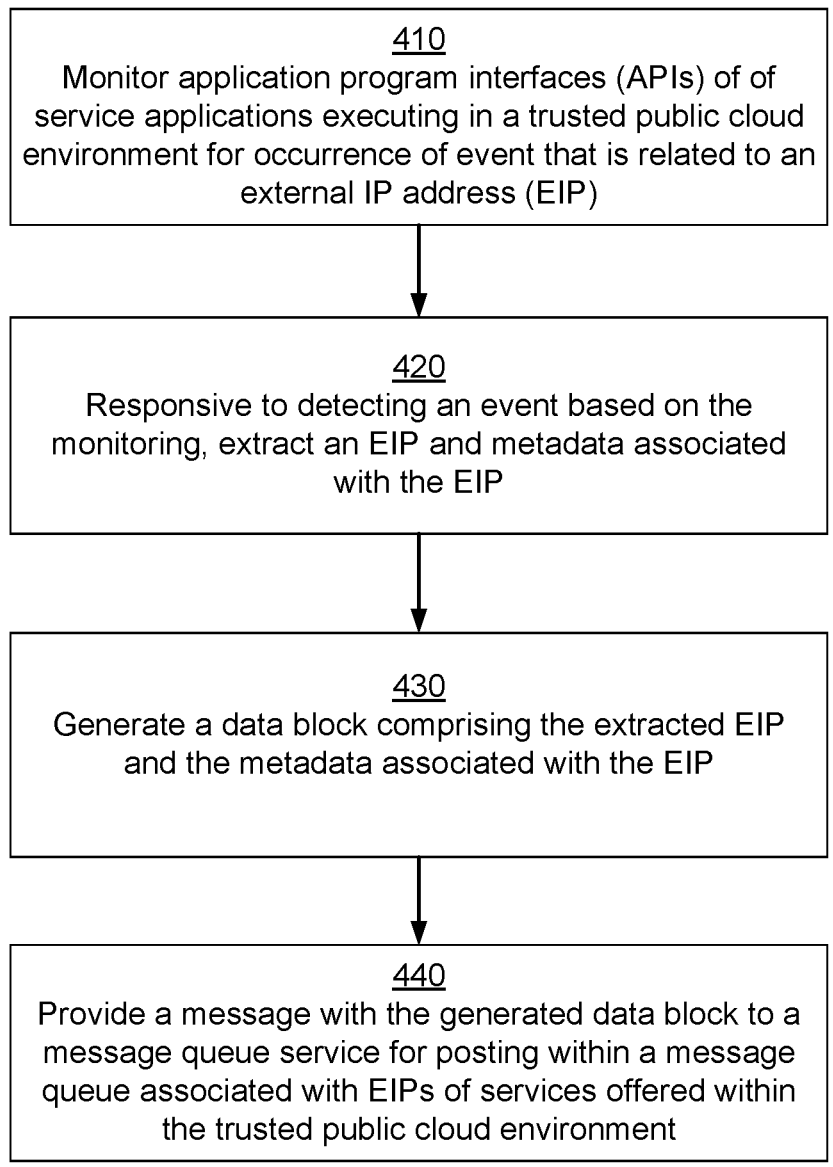
FIG. 4 is a flow chart illustrating the process for detecting information associated with an EIP for a service that is executing within a trusted public cloud environment, according to one embodiment.

FIG. 4 is a flow chart illustrating the overall process for detecting information associated with external IP addresses associated with various service applications offered within corresponding service accounts in a trusted public cloud environment using an EIP detection and maintenance system 300 (shown in FIG. 3) according to one embodiment. The process illustrated herein is performed by an instance of the EIP detection module 310 in system 300 that is executing in a service account of the service application. Various embodiments can perform the steps of FIG. 4 in different orders than those indicated herein. Moreover, other embodiments can include different and/or additional steps than the ones described herein.

The EIP detection and maintenance system 300 monitors 410 application program interfaces of one or more service applications executing within a trusted public cloud environment for occurrence of an event that is related to an EIP. The system 300 triggers upon detecting API call events that are directed to EIP related events. Examples of EIP related events include the following events: associate, disassociate, create an network address translation (NAT) gateway, delete a NAT gateway, and release an EIP.

The EIP detection and maintenance system 300 extracts 420 an EIP and metadata associated with the EIP responsive to detecting a triggering event while monitoring the APIs of the service applications. The system 300 looks up EIP related information associated with the triggering event including: the EIP address, service application details (such as service name, functional domain in which the service application executes, timestamp, etc.), and the triggering event action details such as: "associate", "disassociate", "create NAT gateway", "delete NAT gateway", and "release". In some embodiments, the system 300 may look up service application details from mandatory tags associated with the public cloud environment.

The EIP detection and maintenance system 300 generates 430 a data structure comprising the extracted EIP and the metadata associated with the extracted EIP based on the triggering event action details. The generated data structure may be in a data format that is appropriate for providing to a message queuing service for posting in a message queue within the trusted public cloud environment. In some embodiments, the system 300 packages the EIP-specific details into a JSON data structure to adhere to a pre-specified JSON schema for posting to as an EIP message to an EIP message queue.

The EIP detection and maintenance system 300 provides 440 a message with the generated data structure to a message queue service for posting within a message queue associated with external IP addresses of services offered within the trusted public cloud environment. The provided message may include the packaged EIP details in the created JSON data structure format. In some embodiments, the system 300 may need to acquire pre-specified security-related permissions within the trusted public cloud environment prior to providing the message to the message queue service for posting.

The EIP detection and maintenance system 300 ensures that the updated information regarding the extracted EIP is provided for enabling updates to an entry associated with the extracted EIP in a database storing data in association with EIPs.

EIP Maintenance Process

Figure 5:
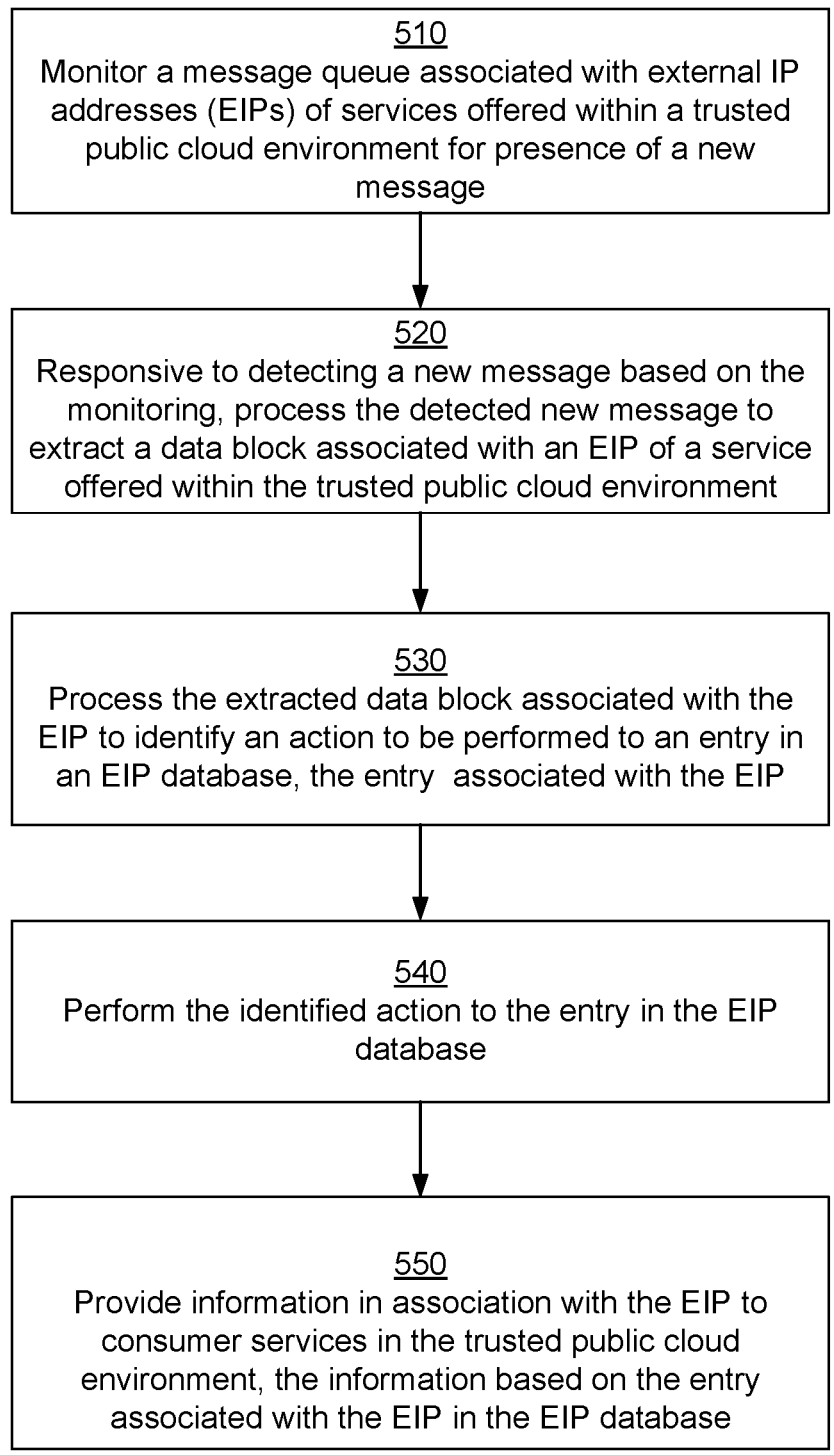
FIG. 5 is a flow chart illustrating the process for maintaining information associated with an EIP for a service that is executing within a trusted public cloud environment, according to one embodiment.

FIG. 5 is a flow chart illustrating the process for storing and maintaining information associated with external IP addresses associated with various service applications offered within corresponding service accounts in a trusted public cloud environment using an EIP detection and maintenance system 300 (shown in FIG. 3) according to one embodiment. The process illustrated herein is performed by the EIP maintenance module 330 in system 300 that is executing in a possibly dedicated account that is centrally located within the trusted public cloud environment and may be accessed by various consumer services requiring information about EIP-related information of service applications that are provisioned within the trusted public cloud environment. Various embodiments can perform the steps of FIG. 5 in different orders than those indicated herein. Moreover, other embodiments can include different and/or additional steps than the ones described herein.

The EIP detection and maintenance system 300 monitors 510 the message queue associated with EIPs of services offered within the trusted public cloud environment for presence of a new message.

The EIP detection and maintenance system 300 processes 520 the detected new message to extract a data structure associated with an EIP of a service offered within the trusted public cloud environment in response to detecting the new message. The system 300 extracts data including: the EIP address, service application details (such as service name, functional domain in which the service application executes, timestamp, etc.), and EIP-related action details from the detected new message. The extracted data structure may be in a JSON data format following a prespecified JSON data schema.

The EIP detection and maintenance system 300 processes 530 the extracted data structure associated with the EIP to identify actions to be performed to an entry in an EIP database storing data in association with EIPs, where the entry is associated with the EIP.). The actions that are identified by the system 300 based on processing the data structure include one of following: "add", "delete", "associate", and "disassociate".

The EIP detection and maintenance system 300 updates 540 the entry associated with the EIP in the EIP database based on the identified action. The identified actions may be performed with respect to modifying EIP related metadata associated with service applications, such as EIP addresses, service names, functional domain identifiers, etc. In some embodiments, the EIP detection and maintenance system 300 may download an EIP list file from a central object storage and perform the identified actions on an EIP related entry instead of updating an entry in an EIP database.

The EIP detection and maintenance system 300 provides information in association with the EIP to consumer services in the trusted public cloud environment. The provided information is based on the updated entry associated with the EIP in the EIP database. In some embodiments, the system 300 may respond to EIP-related queries from the consumer services.

The EIP detection and maintenance system 300 ensures that updated information regarding service applications executing in the trusted public cloud environment and associated EIPs are made available to consumer services in the trusted public cloud environment.

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs multiple salespersons, where each salesperson uses a client device to manage their sales process. Thus, a user might maintain contact data, leads data, customer follow-up data, performance data, goals and progress data, etc., all applicable to that user's personal sales process.

Computer Architecture

Figure 6:
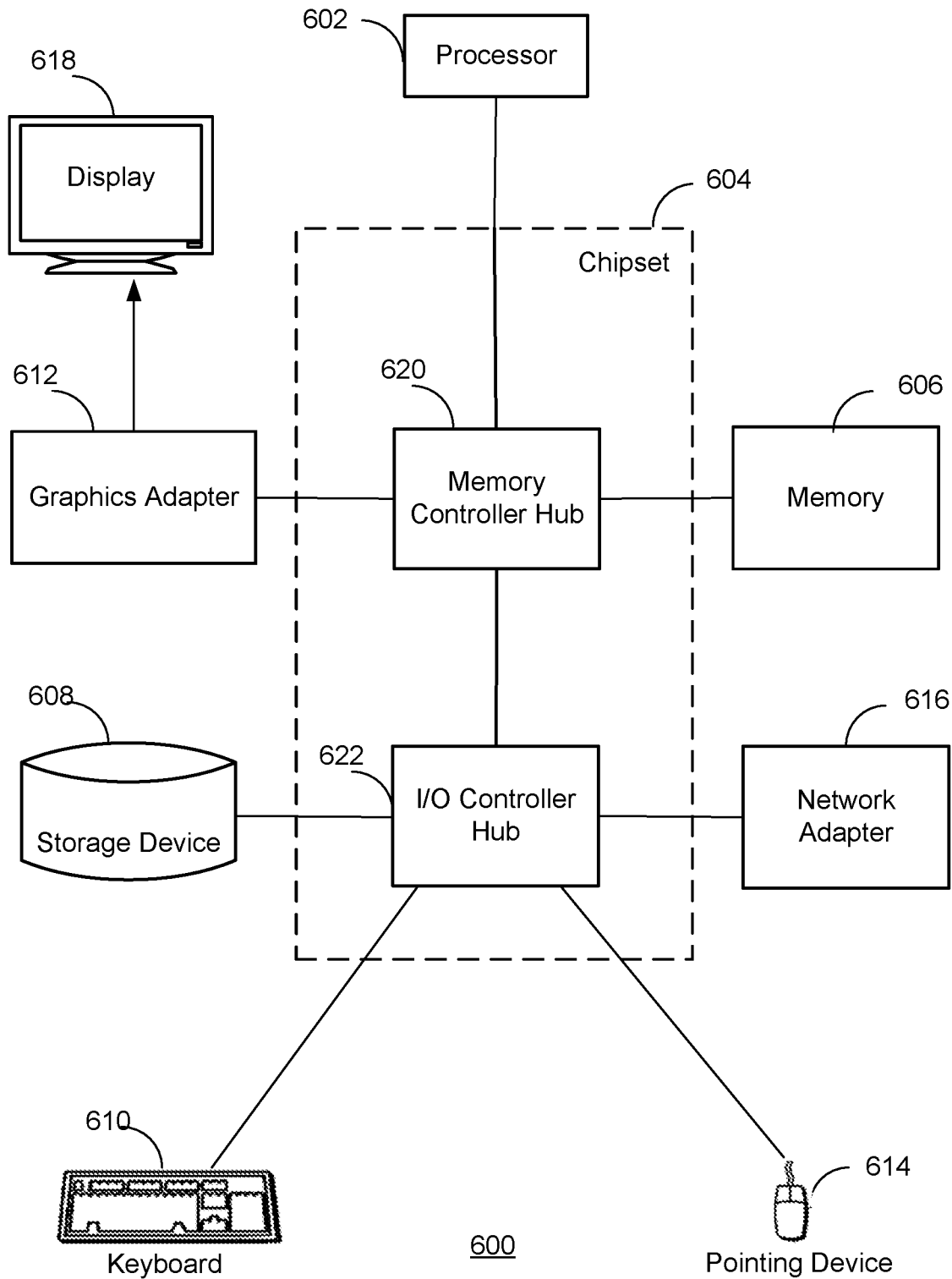
FIG. 6 is a block diagram illustrating the architecture of a typical computer system for use in the environment of FIG. 3 according to one embodiment.

FIG. 6 is a block diagram illustrating the architecture of a typical computer system 600 for use in the environments of FIG. 3 according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer system 600 can have different and/or other components than those shown in FIG. 6. In addition, the computer system 600 can lack certain illustrated components. For example, a computer system 600 acting as an online system 300 may lack a keyboard 610 and a pointing device 614. Moreover, the storage device 608 can be local and/or remote from the computer 600 (such as embodied within a storage area network (SAN)).

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the system of FIG. 3 can vary depending upon the embodiment and the processing power used by the entity. For example, a client device may be a mobile phone with limited processing power, a small display 618, and may lack a pointing device 614. The online system 300 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer-implemented method for acquiring data regarding external IP addresses of services offered in a trusted public cloud environment, the computer-implemented method comprising:
    establishing a functional domain within the trusted public cloud environment, wherein the functional domain comprises a boundary preventing changes in the functional domain from propagating to another functional domain;
    providing an application program interface (API) for a service executing in the trusted public cloud environment and assigned to the functional domain, wherein the service is provisioned with an external IP address (EIP) through which the service is accessible by a consumer service;
    monitoring, via the API, events related to the EIP of the service
    responsive to detecting an event based on the monitoring, extracting EIP data including metadata associated with the EIP;
    generating a data structure including: (i) an action to update a network parameter of the service, (ii) the extracted EIP data, and (iii) metadata associated with the extracted EIP data;
    providing a message including the generated data structure to a message queue service for posting in a message queue associated with the EIP of the service offered in the trusted public cloud environment, wherein the message initiates an update to an entry associated with the EIP of the service in a database storing data in association with EIPs of additional services in the trusted public cloud environment; and
    enforcing a policy, based on the EIP of the service, against the consumer service requesting access to the service via the EIP of the service in the trusted public cloud environment;
    wherein the data structure is generated in response to an API call, and
    wherein the network parameter is one of: a network address translation (NAT) gateway with respect to the EIP, or a virtual private network (VPN) connection.

2. The computer-implemented method of claim 1, wherein the action comprises at least one of:
    associating the EIP to the service;
    disassociating the EIP from the service;
    creating the NAT gateway with respect to the EIP;
    deleting the NAT gateway with respect to the EIP;
    releasing the EIP;
    creating the VPN connection; or
    deleting the VPN connection.

3. The computer-implemented method of claim 1, wherein the metadata associated with the extracted EIP data comprises one or more of:
    an address value of the EIP;
    a name of the service;
    the functional domain in which the service executes;
    a time stamp;
    an allocation identifier; and
    an association identifier.

4. The computer-implemented method of claim 1, wherein generating the data structure comprises packaging the extracted metadata associated with the EIP into a pre-specified data format for providing to the message queue service.

5. The computer-implemented method of claim 4, wherein the pre-specified data format is a JSON data structure comprising metadata associated with the extracted EIP data.

6. The computer-implemented method of claim 1, wherein prior to providing the message with the generated data structure to the message queue service for posting in the message queue, the method further comprises:
acquiring pre-specified permissions for the posting; and
encrypting the generated data structure prior to the posting.

7. A computer system comprising:
a computer processor; and
a non-transitory computer readable storage medium for storing instructions that when executed by the computer processor cause the computer processor to perform steps for acquiring data regarding external IP addresses of services offered in a trusted public cloud environment, the steps comprising:
establishing a functional domain within the trusted public cloud environment, wherein the functional domain comprises a boundary preventing changes in the functional domain from propagating to another functional domain;
providing an application program interface (API) for a service executing in the trusted public cloud environment and assigned to the functional domain, wherein the service is provisioned with an external IP address (EIP) through which the service is accessible by a consumer service;
monitoring, via the API, events related to the EIP of the service;
responsive to detecting an event based on the monitoring, extracting EIP data including metadata associated with the EIP;
generating a data structure including: (i) an action to update a network parameter of the service, (ii) the extracted EIP data, and (iii) metadata associated with the extracted EIP data;
providing a message including the generated data structure to a message queue service for posting in a message queue associated with the EIP of the service offered in the trusted public cloud environment, wherein the message initiates an update to an entry associated with the EIP of the service in a database storing data in association with EIPs of additional services in the trusted public cloud environment; and
enforcing a policy, based on the EIP of the service, against the consumer service requesting access to the service via the EIP of the service in the trusted public cloud environment;
wherein the data structure is generated in response to an API call, and
wherein the network parameter is one of the: a network address translation (NAT) gateway with respect to the EIP, or (iii) a virtual private network (VPN) connection.

8. The computer system of claim 7, wherein the metadata associated with the extracted EIP data, comprises one or more of:
an address value of the EIP;
a name of the service;
the functional domain in which the service executes;
a time stamp;
an allocation identifier; and
an association identifier.

* * * * *

UNITED STATES PATENT AND TRADEMARK OFFICE
CERTIFICATE OF CORRECTION

| | | |
|---|---|---|
| PATENT NO. | : 12,250,197 B2 | Page 1 of 1 |
| APPLICATION NO. | : 17/397772 | |
| DATED | : March 11, 2025 | |
| INVENTOR(S) | : Salter et al. | |

It is certified that error appears in the above-identified patent and that said Letters Patent is hereby corrected as shown below:

On the Title Page

Column 1, Item (71), in "Applicant", Line 1, delete "Salesforce.com," and insert -- Salesforce, Inc., --, therefor.

Column 1, Item (72), in "Inventors", Line 3, delete "Daly Ciy," and insert -- Daly City, --, therefor.

Column 2, Item (57), under "Abstract", Line 12, delete "data. metadata," and insert -- data, metadata, --, therefor.

In the Claims

In Column 16, Claim 1, Line 19, delete "service" and insert -- service; --, therefor.

In Column 18, Claim 7, Line 22, after "or" delete "(iii)".

Signed and Sealed this
Twenty-third Day of September, 2025

John A. Squires
*Director of the United States Patent and Trademark Office*